US012493205B1

(12) United States Patent
Wan et al.

(10) Patent No.: US 12,493,205 B1
(45) Date of Patent: Dec. 9, 2025

(54) ACOUSTO-OPTIC MODULATORS ENHANCED BY SUB-WAVELENGTH ACOUSTIC WAVEGUIDE

(71) Applicant: NINGXIA UNIVERSITY, Ningxia (CN)

(72) Inventors: Lei Wan, Yinchuan (CN); Huilong Liu, Yinchuan (CN); Yuping Chen, Yinchuan (CN); Huipeng Chen, Yinchuan (CN)

(73) Assignee: NINGXIA UNIVERSITY, Yinchuan (CN)

( * ) Notice: Subject to any disclaimer, the term of this patent is extended or adjusted under 35 U.S.C. 154(b) by 0 days.

(21) Appl. No.: 19/209,759

(22) Filed: May 15, 2025

(30) Foreign Application Priority Data

Jul. 21, 2024 (CN) .......................... 202410976629.3

(51) Int. Cl.
*G02F 1/125* (2006.01)
*G02F 1/01* (2006.01)
(Continued)

(52) U.S. Cl.
CPC ............ *G02F 1/125* (2013.01); *G02F 1/0134* (2013.01); *G02F 1/035* (2013.01); *G02F 1/3132* (2013.01);
(Continued)

(58) Field of Classification Search
CPC ........ G02F 1/0134; G02F 1/035; G02F 1/125; G02F 1/3132; G02F 2202/32; G02F 2203/15
(Continued)

(56) References Cited

U.S. PATENT DOCUMENTS 6,747,773 B2 * 6/2004 Theil ...................... B82Y 20/00
359/237
7,283,716 B2 * 10/2007 Park ...................... B82Y 20/00
385/129
(Continued)

FOREIGN PATENT DOCUMENTS

EP 0674386 A1 9/1995

OTHER PUBLICATIONS

"Bi-directional conversion between microwave and optical frequencies in a piezoelectric optomechanical device" by Vainsencher et al, Applied Physics Letters, vol. 109, paper 033107 (Year: 2016).*
(Continued)

*Primary Examiner* — Robert Tavlykaev
(74) *Attorney, Agent, or Firm* — PORUS IP LLC

(57) ABSTRACT

An acousto-optic modulator enhanced by a sub-wavelength acoustic waveguide is provided. The acousto-optic modulator comprising: a substrate, wherein the substrate includes a sapphire underlayment and a silicon dioxide layer disposed on the sapphire underlayment; the substrate further including a lithium niobate thin film, wherein the lithium niobate thin film includes a transducer region and a tapered transition region that are etched, the sub-wavelength acoustic waveguide, an acoustic-photonic crystal cavity, and a side-coupled photonic crystal; wherein the etched transducer region is provided with an interdigital transducer, the sub-wavelength acoustic waveguide is connected with the etched transducer region via the tapered transition region that is etched, the acoustic-photonic crystal cavity is connected with a non-suspended sub-wavelength acoustic waveguide and is arranged parallel to a suspended side-coupled photonic crystal.

19 Claims, 4 Drawing Sheets

(51) Int. Cl.
*G02F 1/035* (2006.01)
*G02F 1/313* (2006.01)

(52) U.S. Cl.
CPC ...... *G02F 2202/32* (2013.01); *G02F 2203/15* (2013.01)

(58) Field of Classification Search
USPC ..................................................... 385/1–4, 7
See application file for complete search history.

(56) References Cited

U.S. PATENT DOCUMENTS

| | | | | |
|---|---|---|---|---|
| 10,914,969 | B2* | 2/2021 | Schmeing | G02F 1/0128 |
| 11,657,314 | B1* | 5/2023 | Xiong | B82Y 20/00 |
| | | | | 385/2 |
| 11,994,786 | B2* | 5/2024 | Groeblacher | G06N 10/40 |
| 12,112,236 | B1* | 10/2024 | Eichenfield | H10N 60/80 |
| 2005/0084213 | A1* | 4/2005 | Hamann | G02B 6/26 |
| | | | | 385/39 |
| 2021/0028760 | A1* | 1/2021 | Ballandras | H03H 9/02236 |
| 2022/0221746 | A1 | 7/2022 | Zhang | |

OTHER PUBLICATIONS

"Microwave-optical quantum frequency conversion" by Han et al, Optica, vol. 8, No. 8, pp. 1050-1064 (Year: 2021).*
"Microwave-to-optics conversion using a mechanical oscillator in its quantum groundstate" by Forsch et al, arXiv:1812.07588v2 (Year: 2020).*
Notification to Grant Patent Right for Invention in Chinese Application No. 202410976629.3 mailed on Dec. 6, 2024, 4 pages.
Huang, Jiying et al., Progress of Thin-Film Lithium Niobate Acousto-Optic Modulators (Invited), Laser & Optoelectronics Progress, 61(11): 81-93, 2024.
Jiang, Wentao et al., Efficient Bidirectional Piezo-Optomechanical Transduction Between Microwave and Optical Frequency, Nature Communications, 2020, 7 pages.

* cited by examiner

ACOUSTO-OPTIC MODULATORS ENHANCED BY SUB-WAVELENGTH ACOUSTIC WAVEGUIDE

CROSS-REFERENCE TO RELATED APPLICATIONS

This application claims priority to Chinese Application No. 202410976629.3, filed on Jul. 21, 2024, the entire contents of which are hereby incorporated by reference.

TECHNICAL FIELD

The present disclosure relates to the field of integrated optics technology, and in particular, to acousto-optic modulators enhanced by a sub-wavelength acoustic waveguide.

BACKGROUND

High-performance acousto-optic modulators occupy an important position in microwave-to-lightwave conversion, which changes the refractive index of a medium through phonon-photon interactions to realize a modulation of an optical field. With the explosive growth of information communication, the acousto-optic modulation device raises higher requirements for a frequency band used for light waves, a modulation rate, an acousto-optic conversion efficiency, and the electric power energy consumption. However, the conversion efficiency of traditional acousto-optic modulation devices is unsatisfactory due to the dimensional and physical properties of an acousto-optic body material. Integrated acoustic-photonic crystal cavity is an important structure in quantum information processing and provides significant structural prototypes for efficient conversion of microwave into light waves. Just as photonic integrated circuits are able to process photons on a chip, phononic integrated circuits may provide a pathway for phonon and photon interactions localized on a chip. An enhancement of phonon-photon interactions on the chip, which facilitates microwave-to-lightwave conversion for quantum information processing. Phononic-photonic crystals, as a representative platform, play an important role in the study of photonic and phononic resonances. Suspended thin-film silicon was first used to make an acoustic-photonic crystal cavity based on the electrostriction effect. Due to a relatively high refractive index of the silicon material, the silicon waveguide is able to bind the photons very well in the acoustic-photonic crystal cavity, thus realizing a high opto-mechanical coupling rate. However, the lack of piezoelectric effect in silicon materials limits the potential of suspended thin-film silicon for microwave-to-optical wave conversion applications. In order to solve the problem of the lack of piezoelectric effect in silicon materials, a frequent approach is to design an acoustic levitation cavity under the crystalline cavity, and to induce acoustic resonance in the acoustic levitation cavity by means of optomechanical vibration, but this approach requires a very high optical Q value of the transmission, which usually needs to reach exceeding $10^7$, and has strict requirements for the manufacturing process, making it difficult to manufacture. How to effectively realize acoustic coupling and acoustic resonance mode excitation in the same material platform attracts extensive research.

In recent years, lithium niobate materials ($LiNbO_3$) have attracted much attention in the industry because of their outstanding electro-optical, nonlinear optical, acousto-optical, piezoelectric, photorefractive, pyroelectric, and photoconductive properties. Another way is to bind the acoustic modes to a mechanical waveguide at the sub-wavelength scale and couple to the acoustic-photonic crystal cavity; this significantly enhances the coupling efficiency of acoustic wave, but the device needs to be suspended as a whole in order to obtain a better acoustic bound state; the working mode is complicated, the conversion efficiency of microwave-to-optical waves is limited, and the device preparation process is difficult. There is still no researcher who has utilized sub-wavelength acoustic waveguides on a non-suspended platform to couple an acoustic-photonic crystal cavity. The variability of the acoustic-photonic crystal cavity determines different mechanical coupling conditions, which require a precise design of the interdigital transducer and acoustic waveguide to match the acoustic energy bands of the acoustic-photonic crystal cavity. Therefore, it is of great practical significance to design an acoustic-photonic crystal cavity that is insensitive to the mechanical coupling conditions and has a wide range of operating conditions.

SUMMARY

One or more embodiments of the present disclosure provide an acousto-optic modulator enhanced by a sub-wavelength acoustic waveguide. The acousto-optic modulator comprises: a substrate, wherein the substrate includes a sapphire underlayment and a silicon dioxide layer disposed on the sapphire underlayment; the substrate further including a lithium niobate thin film, wherein the lithium niobate thin film includes a transducer region and a tapered transition region that are etched, the sub-wavelength acoustic waveguide, an acoustic-photonic crystal cavity, and a side-coupled photonic crystal; wherein the etched transducer region is provided with an interdigital transducer, the sub-wavelength acoustic waveguide is connected with the etched transducer region via the tapered transition region that is etched, the acoustic-photonic crystal cavity is connected with a non-suspended sub-wavelength acoustic waveguide and is arranged parallel to a suspended side-coupled photonic crystal; the interdigital transducer, the tapered transition region, and the sub-wavelength acoustic waveguide are in a non-suspended state relative to the substrate; the acoustic-photonic crystal cavity and the side-coupled photonic crystal are in a suspended state relative to the substrate; and the acoustic-photonic crystal cavity including periodically varying air holes formed by etching a suspended straight waveguide with identical height and width to the sub-wavelength acoustic waveguide, wherein the air holes include a defect region in middle and mirror regions on both sides; the defect region is configured to confine resonance, and the mirror regions are configured to reflect and enhance the resonance.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
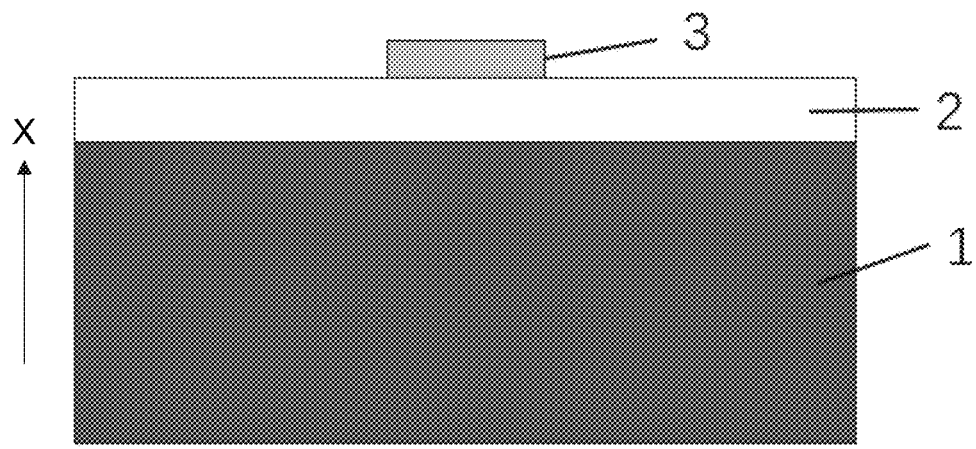
FIG. 1 is a schematic diagram illustrating a sub-wavelength acoustic waveguide cross-section according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 2:
FIG. 2 is a schematic diagram illustrating a top view structure of an acoustic-photonic crystal cavity according to some embodiments of the present disclosure.
Figure 3:
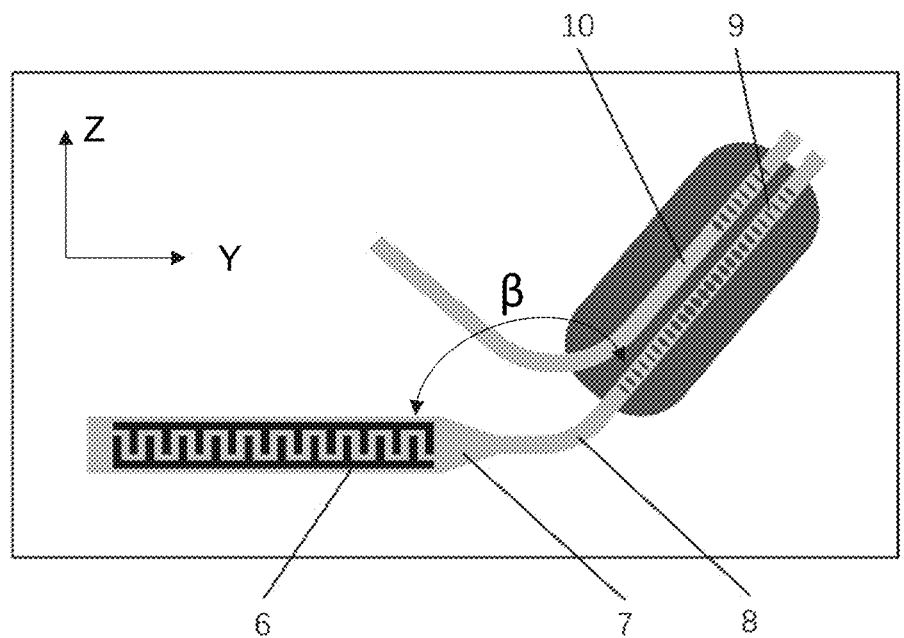
FIG. 3 is a schematic diagram illustrating a top view structure of an acousto-optic modulator enhanced by a sub-wavelength acoustic waveguide according to some embodiments of the present disclosure.

FIG. 1 is a schematic diagram illustrating a sub-wavelength acoustic waveguide cross-section according to some embodiments of the present disclosure. FIG. 2 is a schematic diagram illustrating a top view structure of an acoustic-photonic crystal cavity according to some embodiments of the present disclosure. FIG. 3 is a schematic diagram illustrating a top view structure of an acousto-optic modulator enhanced by a sub-wavelength acoustic waveguide according to some embodiments of the present disclosure.

Some embodiments of the present disclosure provide an acousto-optic modulator enhanced by a sub-wavelength acoustic waveguide. The acousto-optic modulator is disposed on a sapphire-silicon dioxide substrate and includes an interdigital transducer, a tapered transition region, a sub-wavelength acoustic waveguide, and an acousto-photonic crystal cavity.

As shown in FIGS. 1 to 3, some embodiments of the present disclosure provide an acousto-optic modulator enhanced by a sub-wavelength acoustic waveguide; the acousto-optic modulator includes: a substrate including a sapphire underlayment 1, and a silicon dioxide layer 2. The substrate is provided with a lithium niobate thin film 3 as shown in FIG. 1. The lithium niobate thin film 3 is etched with a transducer region, and an interdigital transducer 6 is provided on the transducer region. The transducer region on the lithium niobate thin film 3 is further connected to a sub-wavelength acoustic waveguide 8, an acoustic-photonic crystal cavity 9, and a side-coupled photonic crystal 10. The sub-wavelength acoustic waveguide 8 is connected to the transducer region by a tapered transition region 7, the tapered transition region is formed by etched tapered lithium niobate, the acoustic-photonic crystal cavity 9 is connected to the sub-wavelength acoustic waveguide 8, and the acoustic-photonic crystal cavity 9 is parallel to the side-coupled photonic crystal 10, as shown in FIG. 3.

In some embodiments, the interdigital transducer 6 is provided with the transducer region, and the sub-wavelength acoustic waveguide 8 is connected with the transducer region via the tapered transition region 7 that is etched. The acoustic-photonic crystal cavity 9 is connected with a non-suspended sub-wavelength acoustic waveguide 8 and is arranged parallel to a suspended side-coupled photonic crystal 10.

In some embodiments, the interdigital transducer 6, the tapered transition region 7, and the sub-wavelength acoustic waveguide 8 are in a non-suspended state relative to the substrate. The acoustic-photonic crystal cavity 9 and the side-coupled photonic crystal 10 are in a suspended state relative to the substrate. The acoustic-photonic crystal cavity includes periodically varying air holes formed by etching a suspended straight waveguide with identical height and width to the sub-wavelength acoustic waveguide. The air holes include a defect region in the middle and two mirror regions on both sides; the defect region is configured to confine resonance, and each of the mirror regions is configured to reflect and enhance the resonance.

The sapphire underlayment 1 is formed by using sapphire, and the silicon dioxide layer 2 provided on the sapphire underlayment 1 is formed using silicon dioxide.

The substrate refers to a support portion of the acousto-optic modulator. The sapphire underlayment 1 serves as a base material for the substrate, which provides support and stability. The silicon dioxide layer 2 may be used as an isolation or protection layer to support subsequent processing of layers such as the lithium niobate thin film.

The lithium niobate thin film 3 is configured to realize an acousto-optic effect. The acousto-optic effect refers to a physical phenomenon of an acoustic wave interacting with light waves, and the acousto-optic effect may be utilized for modulation and frequency conversion.

The transducer region refers to a region for generating and converting the acoustic wave. The interdigital transducer (IDT) 6 refers to a device used to convert the electrical signal into an acoustic wave or convert the acoustic wave into the electrical signal. The interdigital transducer 6 includes cross-aligned electrodes that generate an "acoustic-like surface wave" through electrical and acoustic conversion. The acoustic-like surface wave may propagate in a specific direction on the surface of the lithium niobate thin film 3 while having certain clustering characteristics.

In some embodiments of the present disclosure, sapphire is used as the substrate material, and an X-Y lithium niobate thin film is used as a piezoelectric material, and by utilizing the feature of high contrast of the acoustic velocity of sapphire with lithium niobate and silicon dioxide, while obtaining the volume of the acoustic-like surface wave mode that is in effect, the interdigital transducer can excite either Love-like waves mode or pure Rayleigh-like waves mode as an operating mode, with both modes possessing higher microwave-to-acoustic wave conversion efficiencies, resulting in greater acoustic waveguide confinement of an acoustic wave for some embodiments of the substrate of this disclosure.

The X-Y lithium niobate thin film refers to a lithium niobate thin film with X-Y orientation. Lithium niobate belongs to a triangular crystal system, whose crystal axes include the X-axis, Y-axis, and Z-axis as an optical axis. An X-Y orientation indicates that a wafer surface is parallel to the X-axis and Y-axis, while the Z-axis (optical axis) is perpendicular to the wafer surface when the crystal is cut. That is, the X-Y orientation means that the crystal cutting direction is aligned with the X-axis and Y-axis of the lithium niobate crystal axis.

The tapered transition region 7 refers to a tapered structure in the lithium niobate thin film for connecting the transducer region to the sub-wavelength acoustic waveguide 8. In some embodiments, the tapered transition region 7 is formed by etching the lithium niobate thin film. For example, a technique such as plasma dry etching or reactive ion etching (RIE) may be used to etch the lithium niobate thin film into the tapered transition region based on a template. When an acoustic wave enters the tapered transition region 7 from the transducer region, the mode field of the acoustic wave (i.e., a spatial distribution of the acoustic wave in a waveguide or a cavity) gradually transitions along a tapered shape (i.e., a contour of the tapered transition region 7), and a continuous change in a physical dimension between a wider region and a narrower region allows the acoustic wave to be articulated at a lower attenuation and reflection; a smooth taper reduces energy reflections and mode-coupling losses that occur due to a sudden change in the cross-section and allows more of an acoustic energy from the wider transducer region to transition smoothly to the narrower waveguide, improving coupling efficiency.

The sub-wavelength acoustic waveguide 8 refers to a structure that directs or binds the acoustic wave. For example, the structure of the sub-wavelength acoustic waveguide 8 is a waveguide tube. The sub-wavelength acoustic waveguide 8 has a transverse dimension that is smaller than the wavelength of the operating acoustic wave. Because of the tiny dimension of the sub-wavelength acoustic waveguide 8, the sub-wavelength acoustic waveguide strongly binds the transmitted acoustic wave to form a guided mode, ensuring that the acoustic wave has low scattering loss along the intended path. The transverse dimension is the physical width of the sub-wavelength acoustic waveguide in a plane perpendicular to the direction of propagation of the acoustic wave. In some embodiments, the sub-wavelength acoustic waveguide 8 is etched from the lithium niobate thin film 3. For example, the sub-wavelength acoustic waveguide 8 is a structure with a rectangular or trapezoidal cross-section formed by an etching process.

The acoustic-photonic crystal cavity 9 refers to a cavity through which acoustic-photons propagate. For example, the acoustic-photonic crystal cavity 9 includes air holes formed after etching the silicon dioxide layer 2. In some embodiments, the acoustic-photonic crystal cavity 9 is coupled and connected with an end surface of the sub-wavelength acoustic waveguide 8.

The side-coupled photonic crystal 10 refers to a photonic crystal for lateral coupling. For example, the side-coupled photonic crystal 10 includes a plurality of photonic crystals, and the lattice constant of the photonic crystal is 300 nm. The side-coupled photonic crystal 10 is provided in parallel with the acoustic-photonic crystal cavity 9 to provide additional optical input (or extract intra-cavity optical signals) to the acoustic-photonic crystal cavity 9 via side coupling.

In some embodiments of the present disclosure, the transducer region, the tapered transition region 7, the sub-wavelength acoustic waveguide 8, and the acoustic-photonic crystal cavity 9 are all etched from the same lithium niobate thin film 3.

In some embodiments, the interdigital transducer 6, the sub-wavelength acoustic waveguide 8, and the tapered transition region 7 are in the non-suspended state relative to the substrate; the acoustic-photonic crystal cavity 9 and the side-coupled photonic crystal 10 are in the suspended state relative to the substrate.

The non-suspended state is a state of being affixed to the substrate and connected to the sapphire underlayment and the silicon dioxide layer covering it. The suspended state is a state in which an air barrier is formed with the substrate so as to levitate with respect to the substrate.

Merely by way of example, as shown in FIG. 2, the acoustic-photonic crystal cavity 9 consists of a plurality of regularly varying air holes etched within a suspended straight waveguide, having the same height and width as the sub-wavelength acoustic waveguide 8. The air holes of the structure are divided into the defect region 4 (middle) and the mirror regions 5 (both sides); the defect region 4 is used to limit the resonance, and the mirror regions 5 are used to reflect enhanced resonance.

The defect region 4, located in the middle, locally disrupts a periodic structure, confining a specific frequency mode to the central region, thereby achieving effective restriction and localization of optical and acoustic resonances. The mirror regions 5 are located on both sides and enhance resonance by providing strong reflection through a regular distribution of holes, thereby preventing energy leakage from the localized modes to the outside.

In some embodiments, a count of holes in the defect region 4 is 15~60, and a count of holes in each of the mirror regions 5 is 15~60. By precisely controlling the lattice constant, a major axis dimension, and a minor axis dimension of the air holes, the optical resonance wavelength may be tuned across 1450-1600 nm, while an acoustic resonance frequency is adjustable within 0.5-5 GHZ, thereby addressing the critical tuning requirements for the acousto-optic modulator.

In addition, the lattice constant, the major axis, and the minor axis of the air holes are distributed in a quadratic pattern in the defect region 4. To realize the suspended state of the acoustic-photonic crystal cavity 9, it is necessary to etch away the portion of the silicon dioxide layer 2 that is both underneath and in direct contact with the lithium niobate thin film 3, thereby exposing the sapphire underlayment 1 to air.

The suspended state of the acoustic-photonic crystal cavity 9 facilitates an enhancement of the acoustic resonance mode. This mode is more specifically defined as the breathing mode, wherein a vibrational pattern of acoustic oscillations within the cavity manifests as a periodic back-and-forth alternation between contraction and relaxation, thereby achieving a more intense vibrational response.

The lattice constant of the air holes is defined as the spatial period between two adjacent holes (or other repeating units) in a periodically arranged hole structure, i.e., representing their center-to-center distance along an alignment direction. The major axis and the minor axis of the air holes are the two diameters in an elliptical shape (the major axis is the longest diameter, and the minor axis is the shorter diameter that is perpendicular to the major axis). The quadratic pattern refers to that the lattice constant of the air holes and lengths of the major axis and the minor axis are not fixed in the defect region 4, but vary with the position according to a quadratic function, which causes the shape or position of the holes to gradually adjust.

In some embodiments, the side-coupled photonic crystal 10 includes a specular reflection region formed by etched air holes, the acoustic-photonic crystal cavity 9 may provide access to two couplings of the incident wave and the reflected wave, and the air holes enhance the scattering-enhanced fading field, thereby improving the coupling efficiency.

In some embodiments, the width of the transducer region may not be set too wide, and the Rayleigh-like waves and the Love-like waves generated by the transducer region that is too wide are not easily coupled to the sub-wavelength acoustic waveguide 8; similarly, the width of the transducer region should not be too narrow, as a narrow of the transducer region cannot easily achieve to achieve a microwave impedance matching, resulting in low microwave-to-acoustic wave conversion efficiency.

In some embodiments, an acoustic mode in the sub-wavelength acoustic waveguide is a bound-state acoustic-like surface wave mode.

In some embodiments, a waveguide material of the sub-wavelength acoustic waveguide has a large contrast in the speed of acoustic waves with the sapphire underlayment, a mode volume of the acoustic surface-like waves is smaller, and the acoustic surface-like waves are predominantly bound within the lithium niobate waveguide.

In some embodiments, the acoustic-like surface waves excited by the interdigital transducer 6 share similarities with conventional acoustic surface waves in that both propagate along a surface of the medium. A distinction lies in the sub-wavelength acoustic waveguide 8, enabling a strongly confined bound state for the acoustic waves. This implementation of acoustic-like surface waves effectively differentiates a guided propagating bound state acoustic wave from diffusive, unidirectionally propagating acoustic surface waves.

It is important to note that to utilize a complete acoustic-like surface wave to excite an acoustic resonance, the dispersion curve (energy band lines) matching requirement needs to be met at all times throughout a propagation path of the acoustic wave. The acoustic resonance frequency of the acoustic-photonic crystal cavity 9 may also be inferred from the energy band lines.

In some embodiments, a width of the sub-wavelength acoustic waveguide 8 and the acoustic-photonic crystal cavity is within a range of 300 nm to 3000 nm; an angle of the sub-wavelength acoustic waveguide is within a range of 0° to 90°, and a bending radius of the sub-wavelength acoustic waveguide is greater than 20 times an acoustic wavelength. As shown in FIG. 3, the angle $\alpha$ of the sub-wavelength acoustic waveguide refers to an angle of the acoustic-photonic crystal cavity relative to the tapered transition region. For example, when the angle of the sub-wavelength acoustic waveguide is 0°, the acoustic-photonic crystal cavity is parallel to a tapered transition region or the extension direction. The bending radius is the radius of the curved portion of the sub-wavelength acoustic waveguide 8.

For example, the width of the sub-wavelength acoustic waveguide 8 is 1000 nm; the angle of the sub-wavelength acoustic waveguide is 45°, and the bending radius of the sub-wavelength acoustic waveguide is 25 times an acoustic wavelength. For another example, the width of the sub-wavelength acoustic waveguide 8 is 2000 nm; the angle of the sub-wavelength acoustic waveguide is 60°, and the bending radius of the sub-wavelength acoustic waveguide is 20 times an acoustic wavelength. For another example, the width of the sub-wavelength acoustic waveguide 8 is 3000 nm; the angle of the sub-wavelength acoustic waveguide is 60°, and the bending radius of the sub-wavelength acoustic waveguide is 30 times an acoustic wavelength.

In some embodiments, the dimension of the sub-wavelength acoustic waveguide is smaller than the wavelength of the acoustic wave propagating therein, and a width of the acoustic-photonic crystal cavity is maintained in line with the width of the sub-wavelength acoustic waveguide, i.e., the widths are both from 800 nm to 2,500 nm. An integrated device utilizes a curved the sub-wavelength acoustic waveguide to align the piezoelectric and elastic-optic effects optimally along their respective orientations, featuring a bending angle of 0°-90° and a bending radius typically exceeding 20 acoustic wavelengths. When the bending radius is larger than 20 acoustic wavelengths, the bending of the sub-wavelength acoustic waveguide is more gentle, and the acoustic wave is less prone to leakage and scattering in the bending region, which effectively reduces the bending-induced loss.

In some embodiments of the present disclosure, the orientation of the lithium niobate is adjusted to $X-(\theta)Y$ via a curved, non-suspended, sub-wavelength acoustic waveguide. This configuration enables the acoustic-photonic crystal cavity that is suspended and connected at an end of the sub-wavelength acoustic waveguide to fully exploit an excellent elastic-optical effect in the tangential direction of the lithium niobate.

In some embodiments, a thickness of the acoustic-photonic crystal cavity 9 and the side-coupled photonic crystal 10 is maintained in line with a thickness of the sub-wavelength acoustic waveguide 8, and the lattice constant of the acoustic-photonic crystal cavity 9 is within a range of 300 nm to 600 nm, a length along a major axis of the acoustic-photonic crystal cavity is within a range of 400 nm to 1000 nm, and a length along a minor axis of the acoustic-photonic crystal cavity 9 is within a range of 100 nm to 500 nm. The lattice constant, a dimension of the major axis, and a dimension of the minor axis of the acoustic-photonic crystal cavity 9, as above, are capable of presenting better optomechanical properties (e.g., enhanced acoustic resonance). In some embodiments, the defect region 4 includes 15 to 60 unit cells, and each of the mirror regions 5 includes 15 to 60 unit cells; a lattice constant of a photonic crystal of the side-coupled photonic crystal 10 is within a range of 150 nm to 400 nm, a length along a major axis of the photonic crystal is within a range of 200 nm to 600 nm, and a length along a minor axis of the photonic crystal is within a range of 80 nm to 400 nm. The lattice constant, dimensions of the major axis, and dimensions of the minor axis of the side-coupled photonic crystal 10 as described above are capable of presenting better light-wave coupling effects (e.g., high coupling efficiency).

In some embodiments, the lattice constant of the acoustic-photonic crystal cavity is within a range of 200 nm to 600 nm, the length along the major axis of the acoustic-photonic crystal cavity is within a range of 400 nm to 1000 nm, and the length along the minor axis of the acoustic-photonic crystal cavity is within a range of 100 nm to 500 nm.

For example, the lattice constant of the acoustic-photonic crystal cavity 9 is 300 nm, the length along the major axis of the acoustic-photonic crystal cavity is 400 nm, and the length along the minor axis of the acoustic-photonic crystal cavity is 100 nm; the defect region 4 includes 15 unit cells, and each of the mirror regions 5 includes 15 unit cells; the lattice constant of the photonic crystal of the side-coupled photonic crystal 10 is 300 nm, the length along the major axis of the photonic crystal is 500 nm, and the length along the minor axis of the photonic crystal is 200 nm. For example, the lattice constant of the acoustic-photonic crystal cavity 9 is 200 nm, the length along the major axis of the photonic crystal is 1,000 nm, the length along the minor axis of the photonic crystal is 100 nm; the defect region 4 includes 50 unit cells, and each of the mirror regions 5 includes 60 unit cells; and the lattice constant of the photonic crystal of the side-coupled photonic crystal 10 is 400 nm, the length along the major axis of the photonic crystal is 600 nm, and the length along the minor axis of the photonic crystal is 80 nm.

In some embodiments, the thickness of the lithium niobate thin film is within a range of 200 nm to 600 nm, and the thickness of the silicon dioxide layer in the substrate is within a range of 500 nm to 2000 nm. For example, the thickness of the lithium niobate thin film is 500 nm, and the thickness of the silicon dioxide layer in the substrate is 2,000 nm.

In some embodiments, the thickness of the lithium niobate thin film is within a range of 200 nm to 500 nm, and the thickness of the silicon dioxide layer in the substrate is within a range of 500 nm to 2000 nm. At a certain microwave operating frequency, the sub-wavelength acoustic waveguide and each of the mirror regions of the acoustic-photonic crystal cavity consistently have mode energy band lines that can indicate the stable forward transmission of the Love-like waves and shear-like waves.

In some embodiments, the orientation of the lithium niobate thin film 3 is X-Y or X–(θ)Y. The high electromechanical coupling coefficient property of the lithium niobate with the X-Y orientation is used to improve the efficiency of microwave-to-acoustic wave conversion while obtaining purer Love-like waves and purer Rayleigh-like waves. The X–(θ)Y orientation indicates that cutting along the X-axis of the lithium niobate crystal, the acoustic wave propagates along the direction that is rotated by θ degrees counterclockwise from the Y-axis of the crystal; on the contrary, the clockwise pointer is an angle of –θ degrees, denoted as X–(–θ)Y, and θ is generally from 30° to 90°.

In some embodiments, an orientation of the lithium niobate thin film 3 relative to the interdigital transducer 6 is X-Y; a width of the transducer region is within a range of 2 µm to 20 µm; a finger width of the interdigital transducer 6 is within a range of 0.2 µm to 5 µm, a number of finger pairs of the interdigital transducer is within a range of 20 to 300; and the interdigital transducer 6 is configured to excite Rayleigh-like waves and Love-like waves in a frequency range of 300 MHz to 8 GHz. The X-Y refers to cutting along the X-axis of the lithium niobate crystal; the X-axis of the lithium niobate crystal 3 is the direction perpendicular to the substrate, the X-axis is parallel to the X direction as shown in FIG. 1; the Y-axis direction indicates that the acoustic wave propagates along the in-plane Y direction, i.e., the direction of acoustic wave generation by interdigital transducer 6, the Y-axis is parallel to the Y direction as shown in FIG. 3.

In some embodiments, the thickness of the lithium niobate thin film 3 is within a range of 200 nm to 500 nm; the width of the interdigital transducer 6 is within a range of 2 µm to 20 µm; a finger width of the interdigital transducer is within a range of 0.2 µm to 5 µm, the number of finger pairs of the interdigital transducer 6 is within a range of 20 to 100; and the interdigital transducer 6 is configured to excite Rayleigh-like waves and Love-like waves in a frequency range of 300 MHz to 8 GHZ. The sub-wavelength acoustic waveguide 8 has dimensions smaller than the operating acoustic wavelength; the thickness of the sub-wavelength acoustic waveguide 8 is consistent with the thickness of the lithium niobate thin film 3 in the transducer region; the width of the sub-wavelength acoustic waveguide 8 is within a range of 800 nm to 2500 nm.

For example, the thickness of the lithium niobate thin film 3 is 200 nm, the width of the transducer region is 2 µm, the finger width of the interdigital transducer 6 is 0.2 µm, and the number of finger pairs of the interdigital transducer 6 is 50.

In some embodiments of the present disclosure, the acoustic-photonic crystal cavity is insensitive to coupling conditions of the acoustic wave, has broad operating conditions, and may be driven to resonance by a variety of types of IDTs, including, but not limited to, focused IDTs, unidirectional IDTs, unidirectional focused IDTs, and a general type IDT described in the present disclosure.

In some embodiments of the present disclosure, compared to utilizing a suspended higher-order acoustic wave mode, utilizing a fundamental acoustic-like surface wave to excite the acoustic resonance of the acoustic-photonic crystal cavity provides a much higher conversion efficiency and stability of operation; at the same time, utilizing the side-coupled photonic crystal to excite the optical resonance of the acoustic-photonic crystal cavity, i.e., the working mode of simultaneous resonance of photon and phonon, is substantially better than that of the traveling wave interaction in terms of acousto-optic interaction strength, and an ultra-high-efficiency acousto-optic modulator can be obtained.

Merely by way of example, the acousto-optic modulator enhanced by the sub-wavelength acoustic waveguide operates as follows:

Based on the inverse piezoelectric coupling effect of the lithium niobate thin film 3, an input microwave modulation signal is transformed into an acoustic wave signal on the surface of the lithium niobate thin film 3 by the interdigital transducer 6, which affects a mechanical strain field distribution of the lithium niobate thin film 3. A mechanical acoustic wave generated on the surface of the lithium niobate thin film 3 further couples with the sub-wavelength acoustic waveguide 8 through a tapered transition region 7; here the acoustic wave types include the Rayleigh-like waves and the Love-like waves, which are acoustic waves in the transverse wave type, and the direction of vibration is perpendicular to the propagation direction of the acoustic waves. The acoustic wave coupled into the sub-wavelength acoustic waveguide 8 can be well guided, and the acoustic wave is subsequently coupled into the acoustic-photonic crystal cavity 9, which causes acoustic resonance of the acoustic-photonic crystal cavity 9. For the optical mode, the incident light wave is coupled into the defect region 4 of the acoustic-photonic crystal cavity 9 by the side-coupled photonic crystal 10 to generate the optical resonance, and due to the elastic-optical effect, the deformation of the acoustic resonance dramatically alters a refractive index of the acoustic-photonic crystal cavity 9, at which time the acousto-optic interaction occurs, and the optical resonance carries the acoustic wave signal, which means, the optical resonance carries the modulation signal, thereby completing the acousto-optic modulation.

In some embodiments of the present disclosure, the acousto-optic modulator enhanced by the sub-wavelength acoustic waveguide is provided, integrating the smaller size of acoustic-like surface wave mode on the sapphire underlayment, combining the higher electromechanical coupling coefficients and easier excitation of the Love-like waves of lithium niobate with the X-Y orientation, or selecting the Rayleigh-like waves as the operating mode; the acoustic wave excited by the interdigital transducer 6 is coupled into the sub-wavelength acoustic waveguide 8 through the tapered transition region and deflects the acoustic wave to the X−(θ)Y orientation using the bent waveguide; the acoustic wave confined by the sub-wavelength acoustic waveguide 8 further excites the acoustic resonance of the acoustic-photonic crystal cavity 9; the end-incident light wave interacts with the optical resonance of the excited acoustic-photonic crystal through the side-coupled photonic crystal 10. Ultimately, acoustic resonance and optical resonance interact with each other, and combined with the characteristics of the highly elastic optical effect of the lithium niobate with the X−(θ)Y orientation, some embodiments of this disclosure solve the difficulty of coupling the sub-wavelength acoustic waveguides 8 by acoustic surface waves, solve the problem of weak acoustic wave excited by the interdigital transducer 6 with a low coupling efficiency, and finally, solve the problem of the weak strength of the interaction of acoustic and optical waves of conventional acousto-optic modulator.

As shown in FIG. 3, some embodiments of the present disclosure provide an acousto-optic modulator enhanced by the sub-wavelength acoustic waveguide 8 (which is non-suspended), that operates at a microwave frequency of 1.5 GHZ. The acousto-optic modulator includes the interdigital transducer 6, the tapered transition region formed by etching the lithium niobate film 3, the sub-wavelength acoustic waveguide 8, and the acoustic-photonic crystal cavity 9. The interdigital transducer 6 is located in the transducer region having a width of about 4.5 µm and a transducer period of about 2.7 µm, and may excite the Rayleigh-like waves near 1.5 GHZ. The sub-wavelength acoustic waveguide 8 has a width of 1.4 µm and a bending angle θ of 45°. The lattice constant of the acoustic-photonic crystal cavity 9 is 520 nm, the length along the major axis of the acoustic-photonic crystal cavity 9 is 700 nm, and the length along the minor axis of the acoustic-photonic crystal cavity 9 is 300 nm. The lattice constant of the photonic crystal of the side-coupled photonic crystal is 450 nm, the length along the major axis of the photonic crystal is 500 nm, and the length along the minor axis of the photonic crystal is 200 nm. Ultimately, optical resonance will occur at a wavelength of 1562 nm, and acoustic resonance will occur at 1.5 GHz.

As shown in FIG. 3, some embodiments of the present disclosure provide the acousto-optic modulator, enhanced by the sub-wavelength acoustic waveguide 8 (which is non-suspended), that operates at a microwave frequency of 1.55 GHz and includes the interdigital transducer 6, the tapered transition region formed by etching the lithium niobate thin film 3, the sub-wavelength acoustic waveguide 8, and the acoustic-photonic crystal cavity 9. The interdigital transducer 6 is located in the transducer region having a width of about 8.3 µm and a transducer period of about 2.05 µm, and may be used in the vicinity of 1.5 GHz to excite the Love-like waves. The sub-wavelength acoustic waveguide 8 has an approximate width of 1.5 µm and a bending angle θ of 40°. The acoustic-photonic crystal cavity 9 has a lattice constant of 500 nm, the length along the major axis of the acoustic-photonic crystal cavity is 800 nm, and the length along the minor axis of the acoustic-photonic crystal cavity is 400 nm. The side-coupled photonic crystal 10 has a lattice constant of 450 nm, the length along the major axis of the side-coupled photonic crystal 10 is 600 nm, and the length along the minor axis of the side-coupled photonic crystal 10 is 300 nm. Ultimately, optical resonance occurs at a wavelength of 1543 nm, and acoustic resonance occurs at 1.55 GHz.

In some embodiments of the present disclosure, the acousto-optic modulator has a high modulation efficiency, strong acousto-optic interactions, and broad application prospects. In addition, the acousto-optic modulator may use a topological acoustic-photonic crystal to further limit a mode volume and strengthen a localization effect at the same time, a good resistance to defects can be achieved, and acoustic-photonic crystal modulators designed based on the topological idea are expected to have a good performance in terms of the acousto-optic conversion efficiency and acousto-optic interaction strength.

In some embodiments of the present disclosure, the use of a non-suspended sub-wavelength acoustic waveguide to drive a suspended acoustic-photonic crystal cavity excites both the Love-like waves mode and the Rayleigh-like waves mode in a strongly bound state, which significantly enhances the modulation efficiency of the acousto-optic modulator and conversion efficiency of the acousto-optic modulator. Meanwhile, the device of the acousto-optic modulator is simple to prepare, and has a broad application prospect in the field of signal processing.

Figure 4:
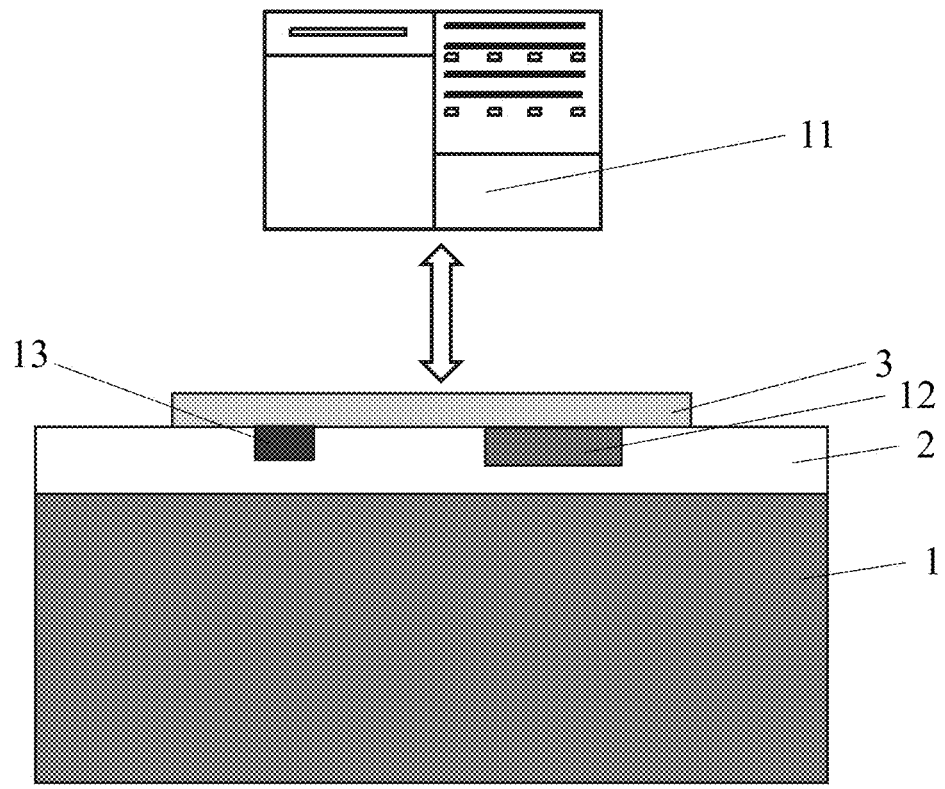
FIG. 4 is a schematic illustrating a sub-wavelength acoustic waveguide cross-section according to some embodiments of the present disclosure.

FIG. 4 is a schematic illustrating a sub-wavelength acoustic waveguide cross-section according to some embodiments of the present disclosure.

In some embodiments, as shown in FIG. 4, the acousto-optic modulator further includes a microprocessor chip 11, and the acoustic-photonic crystal cavity 9 is further integrated with an electrothermal microactuator (MEMS) 12; the microprocessor chip 11 is configured to control the electro-thermal micro-actuator 12 in the acoustic-photonic crystal cavity 9 for heating.

The microprocessor chip 11 refers to a chip used to process a wide variety of data and instructions generated by the acousto-optic modulator during a modulation process. For example, the microprocessor chip may include a programmable logic controller (PLC) chip, a system on chip (SoC) chip, or the like.

In some embodiments, the microprocessor chip includes a remote processor, the remote processor is configured for MEMS communication connection (as shown in FIG. 4). For example, the remote processor is a cloud server, a virtualization processor, or the like. In some embodiments, the microprocessor chip is integrated on the acousto-optic modulator, electrically coupled to the electro-thermal micro-actuator.

The MEMS refers to a micromechanical device that is driven using an electrothermal conversion mechanism. For example, the MEMS includes bimetallic thermally driven micromirrors. Merely by way of example, the MEMS consists of electrothermal elements (e.g., resistance wires, thin films), thermally expandable materials (e.g., metals, polymers), and mechanical structures (e.g., cantilever beams, bimetals). The MEMS is capable of generating deformations to drive micrometer-scale mechanical motions by heating with electrical currents, e.g., the heating of the MEMS can cause the acoustic-photonic crystal cavity 9 to deform, thereby changing the lattice constant of the acoustic-photonic crystal cavity 9.

In some embodiments, the MEMS is integrated into the acoustic-photonic crystal cavity 9. For example, the MEMS is set on the lithium niobate thin film in the vicinity of the acoustic-photonic crystal cavity 9 (e.g., set between the silicon dioxide layer that has not been completely etched away and the lithium niobate thin film).

In some embodiments, the MEMS has a progressive heating mode, whereby the rate of heating may be adjusted, thereby reducing thermal stress. In some embodiments, an upper limit of the heating temperature of the MEMS may be set by the microprocessor chip; when the heating temperature reaches the upper limit of the heating temperature, the MEMS may trigger an overheating protection mechanism (e.g., by reducing the heating power or suspending the operation).

In some embodiments, the microprocessor chip may control the electrothermal microactuator to heat the acoustic-photonic crystal cavity 9 in a variety of ways. For example, a temperature sensor (e.g., thermocouple, thermistor) is integrated into the acousto-optic modulator, and the temperature sensor is used to monitor a cavity temperature of the acoustic-photonic crystal cavity 9; the microprocessor chip adjusts heating parameters of the MEMS in response to the cavity temperature falling below a lower temperature limit, causing the cavity temperature to return to a preset temperature range.

The heating parameters are parameters related to the heating of the MEMS. In some embodiments, the heating parameters of the MEMS include a target temperature. The target temperature is a pre-determined temperature to be reached by the MEMS, which is either desired or set. In some embodiments, when the MEMS includes a progressive heating mode, the target temperature includes target temperatures for each time period. The MEMS may achieve the target temperature by converting the heating parameters to parameters that are internally executable by the MEMS, such as using PID control.

In some embodiments of the present disclosure, heating the acoustic-photonic crystal cavity 9 using MEMS can change the lattice constant of the lithium niobate by means of localized heating to dynamically regulate the acoustic resonance frequency and the optical resonant wavelength.

In some embodiments, the acousto-optic modulator further includes a monitoring device 13 (as shown in FIG. 4), wherein the monitoring device 13 is configured to acquire sensor data; the monitoring device 13 includes a temperature sensor, a humidity sensor, and a pressure sensor. The microprocessor chip is also configured to determine the heating parameters of the MEMS based on the sensor data and physical characteristics.

The monitoring device refers to a device for monitoring the state of the acousto-optic modulator. In some embodiments, the monitoring device includes a temperature sensor, a humidity sensor, and a pressure sensor. In some embodiments, the monitoring device is disposed on the lithium niobate thin film near the acoustic-photonic crystal cavity 9. In some embodiments, the temperature sensor, the humidity sensor, the pressure sensor, or the like may be integrated into the microprocessor chip when the microprocessor chip is integrated on the acousto-optic modulator.

The sensor data refers to data acquired by the monitoring device. For example, the sensor data includes the cavity temperature acquired by the temperature sensor, the cavity humidity acquired by the humidity sensor, pressure data acquired by the pressure sensor, or vibration data. In some embodiments, the monitoring device further includes an accelerometer. The accelerometer is configured to acquire vibration data.

The physical characteristics are parameters related to physical specifications of the acousto-optic modulator. For example, the physical characteristics include major axis dimensions, dimensions of the minor axis, a count of cells of the defect region 4 and each of the mirror regions 5 of the air holes of the sub-wavelength acoustic waveguide 8 and the acoustic-photonic crystal cavity 9; an angle of the sub-wavelength acoustic waveguide; a thickness of the lithium niobate thin film, and a thickness of the silicon dioxide layer; a width of the transducer region, the finger width of the interdigital transducer and the number of finger pairs, or the like.

In some embodiments, the physical characteristics may be determined by input or measurement by a technician.

In some embodiments, the microprocessor chip constructs a stabilizing feature vector based on the sensor data and the physical characteristics and determines the heating parameters of the MEMS based on a retrieval result of the stabilizing feature vector in a first vector database. The first vector database includes a plurality of reference stabilizing feature vectors and the heating parameters corresponding to each reference stabilizing feature vector.

In some embodiments, the first vector database is constructed by performing: conducting experiments on the acousto-optic modulator under different experimental conditions, taking the physical characteristics of the experiments and the sensor data acquired during the experiments as reference stabilizing feature vectors; wherein the experiments include heating the acoustic-photonic crystal cavity 9 to different temperatures by the MEMS and modulating the acoustic-photonic crystal cavity 9, recording the data and determining a modulation score; designating a heating parameter (the target temperature) when the modulation score of the MEMS is high as a reference heating parameter corresponding to the reference stabilizing feature vector; and placing the plurality of reference stabilizing feature vectors and the corresponding reference heating parameters into the first vector database. The vector database includes Milvus, Faiss, and other databases that support fast similarity searches for high-dimensional vectors.

The modulation score refers to a score related to modulation effects. In some embodiments, the modulation score is positively correlated with acousto-optic conversion efficiency and negatively correlated with an acoustic wave propagation loss. The acousto-optic conversion efficiency refers to a ratio of input microwave power to output optical power. The acousto-optic conversion efficiency may be obtained by a microwave power meter and a photodetector set externally to the acousto-optic modulator. The acoustic wave propagation loss refers to data that evaluates the efficiency of a waveguide coupling and the quality of the acoustic wave transmission. The acoustic wave propagation loss may be determined by comparing the difference between an input power of the interdigital transducer and the received power of the acoustic-photonic crystal cavity; the input power of the interdigital transducer and a received power of the acoustic-photonic crystal cavity may be obtained using a microwave power meter set externally to the acousto-optic modulator.

In some embodiments, the microprocessor chip may select the reference heating parameter corresponding to the reference stabilizing feature vector having the smallest vector distance as the heating parameter by calculating a vector distance between the stabilizing feature vector and the reference stabilizing feature vector.

In some embodiments, the microprocessor chip is further configured to determine a target lattice constant based on the input signal feature, the physical characteristics, a current drive power, a current drive voltage, and the sensor data, and to determine the heating parameter based on the target lattice constant.

The input signal feature is a feature associated with the input signal. For example, the input signal feature includes an optical wavelength, an acoustic wave frequency, or the like. In some embodiments, the input signal feature may be preset by the technicians. For example, technicians may obtain the input signal feature and input the input signal feature through a Fiber Bragg Grating (FBG) sensor, an oscilloscope, and a piezoelectric sensor. For example, the optical wavelength may be obtained using an FBG sensor. The acoustic wave frequency may be acquired using the oscilloscope in combination with the piezoelectric sensor.

The current drive power refers to a drive power of the interdigital transducer 6 at the present moment. The current drive voltage is a drive voltage of the interdigital transducer 6 at the present moment. The current drive power and the current drive voltage may be directly read by the microprocessor chip.

Understandably, the inverse piezoelectric effect of the lithium niobate produces a strain that results in a change in the lattice constant when the drive voltage is applied to the interdigital transducer 6. Therefore, when determining the heating parameter of MEMS, it is necessary to combine the change in the lattice constant caused by the drive voltage.

The target lattice constant refers to a lattice constant that gives better modulation. More descriptions regarding the lattice constant may be found in the related descriptions above.

Figure 5:
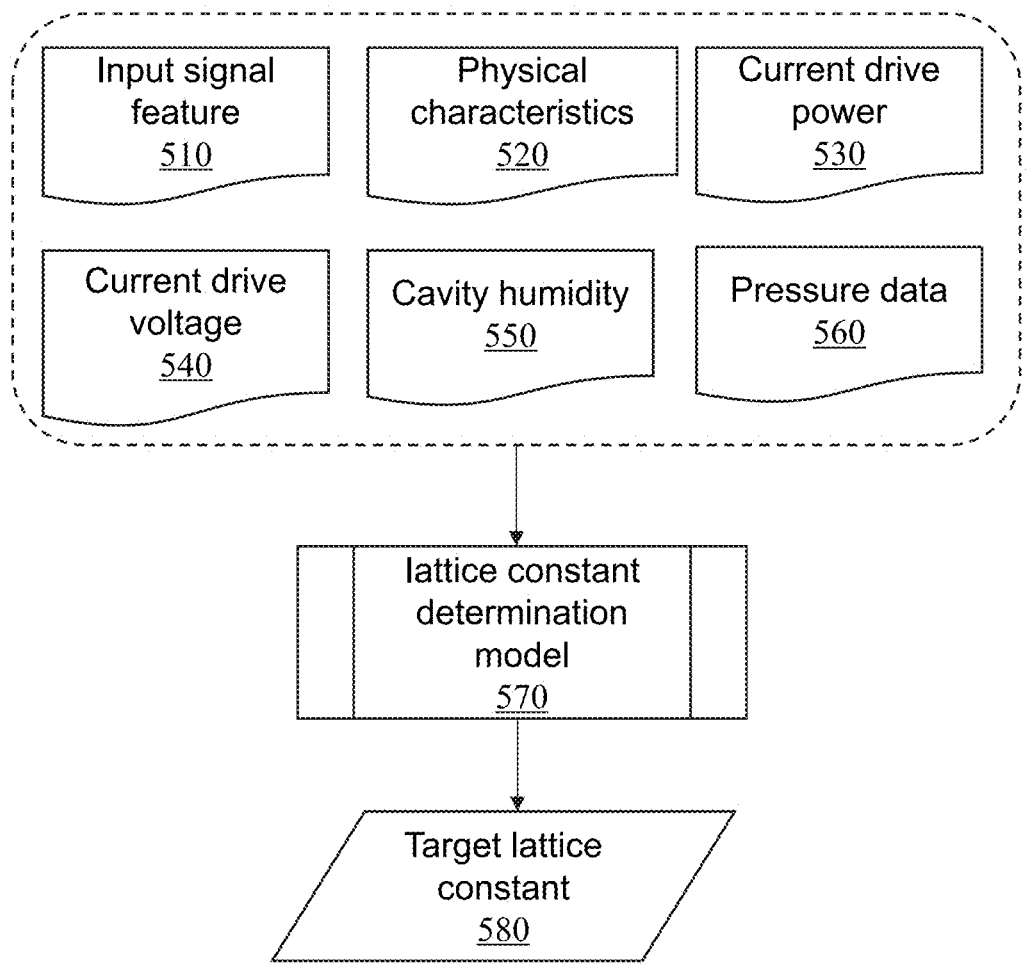
FIG. 5 is a schematic diagram illustrating determining a target lattice constant according to some embodiments of the present disclosure.

FIG. 5 is a schematic diagram illustrating determining a target lattice constant according to some embodiments of the present disclosure In some embodiments, the microprocessor chip may determine a target lattice constant 580 by a lattice constant determination model 570 based on an input signal feature 510, physical characteristics 520, a current drive power 530, a current drive voltage 540, a cavity humidity 550, and pressure data 560, as shown in FIG. 5.

More descriptions regarding the input signal feature, the physical characteristics, the current drive power, the current drive voltage, the cavity humidity, and the pressure data may be found in the related descriptions above.

In some embodiments, the lattice constant determination model 570 may be a machine learning model. For example, the lattice constant determination model is a Neural Network (NN) model.

The lattice constant determination model may be obtained by training a plurality of first training samples with first labels. For example, the microprocessor chip may input the plurality of first training samples with first labels into an initial lattice constant determination model, construct a loss function through each first label and the output of the initial lattice constant determination model, and iteratively update parameters of the initial lattice constant determination model based on the loss function by a manner such as gradient descent. When a preset condition is satisfied, the model training is completed, and the trained lattice constant determination model is obtained. The preset condition may be that a loss function converges, a number of iterations reach a threshold, or the like.

In some embodiments, the first training sample includes a sample input signal feature, sample physical characteristics, a sample current drive power, a sample current drive voltage, a sample cavity humidity, and sample pressure data. The first label includes the target lattice constant corresponding to the first training sample.

The first training sample and the first label may be obtained experimentally. For example, the technicians use the first training sample as an experimental condition, conducts experiments on a plurality of acousto-optic modulators with different lattice constants, acquire acoustic-optic conversion efficiencies during a preset time period, signal-to-noise ratios, acoustic wave propagation losses, difference in resonant frequencies, and other data, and determine corresponding modulation score; and selects the lattice constant corresponding to the modulation score with the highest score among them as the first label corresponding to that first training sample. The preset time period may be set by a person skilled in the art based on experience.

More descriptions regarding the modulation score may be found in the related descriptions above. The modulation score is also positively correlated with the acousto-optic conversion efficiency and the signal-to-noise ratio, and negatively correlated with the acoustic wave propagation loss and the difference in resonant frequencies. Additionally, the modulation score may also be a weighted sum of the data of the acousto-optic conversion efficiency, the signal-to-noise ratio, the acoustic wave propagation loss, and the difference in resonant frequencies, and the weights may be set by a person skilled in the art based on experience.

The difference in resonant frequencies refers to a difference between a current acoustic resonance frequency and a target resonance frequency. In some embodiments, an acoustic wave sensor may be integrated on the microprocessor chip or the acousto-optic modulator at a location on the microprocessor chip or acousto-optic modulator at which an acoustic wave can be captured. The acoustic wave sensor is used to capture the current acoustic resonance frequency, and the microprocessor chip may compute the current difference between the current acoustic resonance frequency and the target resonance frequency, and thus determine the difference in resonant frequencies.

In some embodiments, the microprocessor chip may determine the heating parameter corresponding to the target lattice constant based on the target lattice constant and the current drive voltage by using a mapping table.

The mapping table includes a plurality of mapping tables or mapping relationships between a plurality of reference lattice constants, reference drive voltages, and reference heating parameters. The mapping table may be constructed through experimentation. For example, the technicians may conduct experiments under different experimental heating parameters (i.e., the above-described reference heating parameters) and experimental drive voltages (i.e., the above-described reference drive voltages) and obtain corresponding experimental lattice constants (i.e., the above-described reference lattice constants), constructing the mapping table by means of the experimental heating parameters, experimental drive voltages, and experimental lattice constants that are corresponding to each other.

In some embodiments of the present disclosure, determining a target lattice constant based on the input signal features, the physical characteristics, the current drive power, and the current drive voltage, and the sensor data allows for accurate control of acousto-optic interactions; determining the target lattice constant based on the heating parameters allows for avoiding excessive heating to slow down the performance degradation of the acousto-optic modulator and improve the service life.

In some embodiments, the microprocessor chip is further configured to determine a target drive power for the interdigital transducer 6 based on modulation effect data.

The modulation effect data refers to data that reflects or characterizes the quality of modulation. For example, the modulation effect data includes the acousto-optic conversion efficiency, the acoustic wave propagation loss, and the difference in resonant frequencies, as mentioned previously. More descriptions regarding definitions and ways of obtaining the acousto-optic conversion efficiency, the acoustic wave propagation loss, and the difference in resonant frequencies may be found in the related descriptions above.

The target drive power refers to a power required to drive the interdigital transducer 6 when achieving the target effect. In some embodiments, the target drive power may be entered into the lattice constant confirmation model as the current drive power. A corresponding lattice constant confirmation model outputs a target lattice parameter that is obtained based on the preset target drive power, rather than using a fixed lattice constant, thereby optimizing the modulation.

In some embodiments, the microprocessor chip performs a plurality of tests of the acousto-optic modulator by iterating to obtain a plurality of drive powers and modulation effect data corresponding to the interdigital transducer 6 during the preset time period, and the drive power that satisfies the preset condition is used as the target drive power.

The preset condition may include a difference between the acousto-optic conversion efficiency and the target acousto-optic conversion efficiency during the preset time period being less than a first threshold, a difference between the acoustic wave propagation loss and the target acoustic wave propagation loss being less than a second threshold, or a weighted sum of the acousto-optic conversion efficiency and the acoustic wave propagation loss being less than a third threshold. The preset time period, the first threshold, the second threshold, the third threshold, and the weights may be set by a person skilled in the art based on experience.

The above iterative process may include:

S1: setting initial parameters. For example, setting an initial drive power $P_0$ (e.g., $P_0=10$ mW), a learning rate $\alpha$ (e.g., $\alpha=0.1$), a perturbation step size $\Delta P$ (e.g., $\Delta P=0.5$ mW), a convergence threshold $\epsilon$ (e.g., $\epsilon=0.1\%$), and a maximal number of iterations $N_{max}$ (e.g., $N_{max}=50$), wherein a safe range of drive power is [n,m].

The learning rate $\alpha$ is used to control a step size, the perturbation step size $\Delta P$ is used to determine a gradient, and the convergence threshold $\epsilon$, the maximum number of iterations $N_{max}$, and the safe range of drive power are used to determine the iteration efficiency and as a condition for ending the iterative process, n and m are positive numbers, and the specific values may be set by a person skilled in the art based on experience.

S2: performing iterative optimization. S2 may include operations S21-S24.

S21: measuring the drive power and iteration efficiency of the current iteration round. For example, the drive power of the i-th iteration is $P_i$, and the iteration efficiency of the i-th iteration is $\eta_i$. The drive power of the i-th iteration $P_i$ may be read directly, and the iteration efficiency of the i-th iteration $\eta_i$ may be equated to the modulation score at a drive power of $P_i$ for the i-th iteration. More descriptions regarding the modulation score may be found in FIG. 5 and related descriptions thereof.

S22: based on the perturbation step size $\Delta P$, determining the drive power after the perturbation and the corresponding iteration efficiency after the perturbation. For example, the drive power after the perturbation of the i-th iteration is $P_i+\Delta P$, and the corresponding post-perturbation iterative efficiency of the i-th iteration is $\eta_{i+\Delta}$. The drive power after perturbation and the iterative efficiency after perturbation are obtained in the same way as in the operation S21.

S23: calculating the gradient. For example, the gradient may be calculated by the following equation (1).

$$\frac{\partial \eta}{\partial P} \approx \frac{\eta_{i+\Delta} - \eta_i}{\Delta P} \quad (1)$$

Wherein $$\frac{\partial \eta}{\partial P}$$

denotes a gradient, $\eta_{i+\Delta}$ denotes the perturbation efficiency of the i-th iteration, $\eta_i$ denotes the efficiency of the i-th iteration, and $\Delta P$ denotes the perturbation step size.

S24: determining an updated drive power. For example, the updated drive power may be calculated by the following equation (2).

$$P_{i+1} = P_i + \alpha \frac{\partial \eta}{\partial P} \quad (2)$$

Wherein $P_{i+1}$ denotes the drive power of the i-th iteration, [n, m] denotes the drive power of the i-th iteration, a denotes the learning rate, and $$\frac{\partial \eta}{\partial P}$$

denotes the gradient.

S3: ending the iteration when the preset iteration condition is satisfied. The preset iteration condition may include one of $P_{i+1}$ exceeding the safety range [n, m], $|\eta_{i+1}-\eta_{i+1}|<\epsilon$, number of iterations exceeding $N_{max}$.

Understandably, the iterative process described above reduces debugging time and reduces the amount of data compared to a step-by-step debugging approach to determine the target drive parameters.

In some embodiments, the microprocessor chip is further configured to: obtain candidate a drive power; determine, based on the input signal feature, the sensor data, material properties, a candidate drive power, and an electromagnetic interference feature, modulated prediction data corresponding to each candidate drive power using a prediction model; and based on the modulated prediction data corresponding to each candidate drive power, determine a target drive power.

More descriptions regarding the input signal feature and the sensor data may be found in the related descriptions above.

The material properties are properties associated with a material of the acousto-optic modulator. For example, the material properties may include electrical properties (e.g., piezoelectric constants, etc.), optical properties (e.g., elasticity coefficient, refractive index, etc.), and acoustic properties (e.g., speed of propagation of acoustic wave, acoustic attenuation coefficients, and acoustic impedance, etc.) of the material of the acousto-optic modulator (e.g., a lithium niobate material). The material properties may be manually preset or obtained by the technicians from a factory report of the acousto-optic modulator.

The electromagnetic interference feature is a feature associated with an external electromagnetic field that generates interference. For example, the electromagnetic interference feature may include electromagnetic field strength, frequency distribution of an interference signal, and direction of an interference source. In some embodiments, the technicians or the microprocessor chip may obtain the electromagnetic interference feature by electromagnetic field probes (EM Field Probes) provided externally to the acousto-optic modulator.

The candidate drive power refers to a power alternatively used to drive the interdigital transducer 6.

In some embodiments, the microprocessor chip may be randomly adjusted within a preset power range based on the current drive power of the interdigital transducer 6 to obtain the candidate drive power. The preset power range may be preset by a person skilled in the art based on experience. For example, the preset power range is a range of drive power corresponding to a drive power at which the interdigital transducer 6 may not be damaged.

In some embodiments, the microprocessor chip is further configured to: determine a preset candidate range based on the material properties, the electromagnetic interference feature, and the physical characteristics; and generate candidate drive power based on the preset candidate range.

More descriptions regarding the physical characteristics may be found in the related descriptions above.

The preset candidate range is a range of preset candidate drive power.

In some embodiments, the microprocessor chip may construct a noise feature vector based on the material properties, the electromagnetic interference feature, and the physical characteristics, and determine, based on the noise feature vectors, a reference candidate range corresponding to the reference noise feature vector in the second vector database that satisfy a first preset condition is determined as the preset candidate range. The first preset condition may include one of the vector distance between the reference noise feature vector and the noise feature vector being less than a distance threshold, or the similarity between the reference noise feature and the noise feature vector being greater than a similarity threshold. The distance threshold and the similarity threshold may be set by a person skilled in the art based on experience.

The second vector database may contain a plurality of reference noise feature vectors and the corresponding reference candidate ranges. The second vector database may be constructed experimentally, and operations may include: constructing a reference noise feature vector based on reference material properties, a reference electromagnetic interference feature, and a reference physical characteristics; based on the reference noise feature vector, starting from a theoretical minimum drive power, gradually (e.g., increasing by 2% each time) increasing the drive power and recording a signal-to-noise ratio corresponding to each drive power; based on the drive power and the signal-to-noise ratio corresponding to the drive power, plotting a drive power-signal-to-noise ratio curve; in the drive power-signal-to-noise ratio curve, designating a range of drive power corresponding to the signal-to-noise ratio being greater than a threshold as a reference candidate range corresponding to the reference noise feature vector; and by the above manners, determining a plurality of reference noise feature vectors and corresponding reference candidate ranges and placing the plurality of reference noise feature vectors and the corresponding reference candidate ranges into the second vector database. The theoretical minimum drive power and the threshold may be set by a person skilled in the art based on experience.

In some embodiments, the microprocessor chip may select the candidate drive power from the preset candidate range.

In some embodiments of the present disclosure, determining the candidate drive powers based on the material properties, the electromagnetic interference feature, and the physical characteristics can improve the environmental suitability of the acousto-optic modulator. Additionally, setting the signal-to-noise ratio higher than a threshold can reduce noise interference and safeguard modulation quality.

The modulated prediction data refers to data used to predict the modulation score. In some embodiments, the modulated prediction data may include a predicted acousto-optic conversion efficiency, a predicted acoustic wave propagation loss, a predicted difference in resonant frequencies, a predicted signal-to-noise ratio, and a predicted modulation efficiency.

The modulation efficiency is used to characterize the ability of the modulator to convert a microwave signal into an optical signal. For example, the modulation efficiency may include modulation depth, extinction ratio, and response time.

Figure 6:
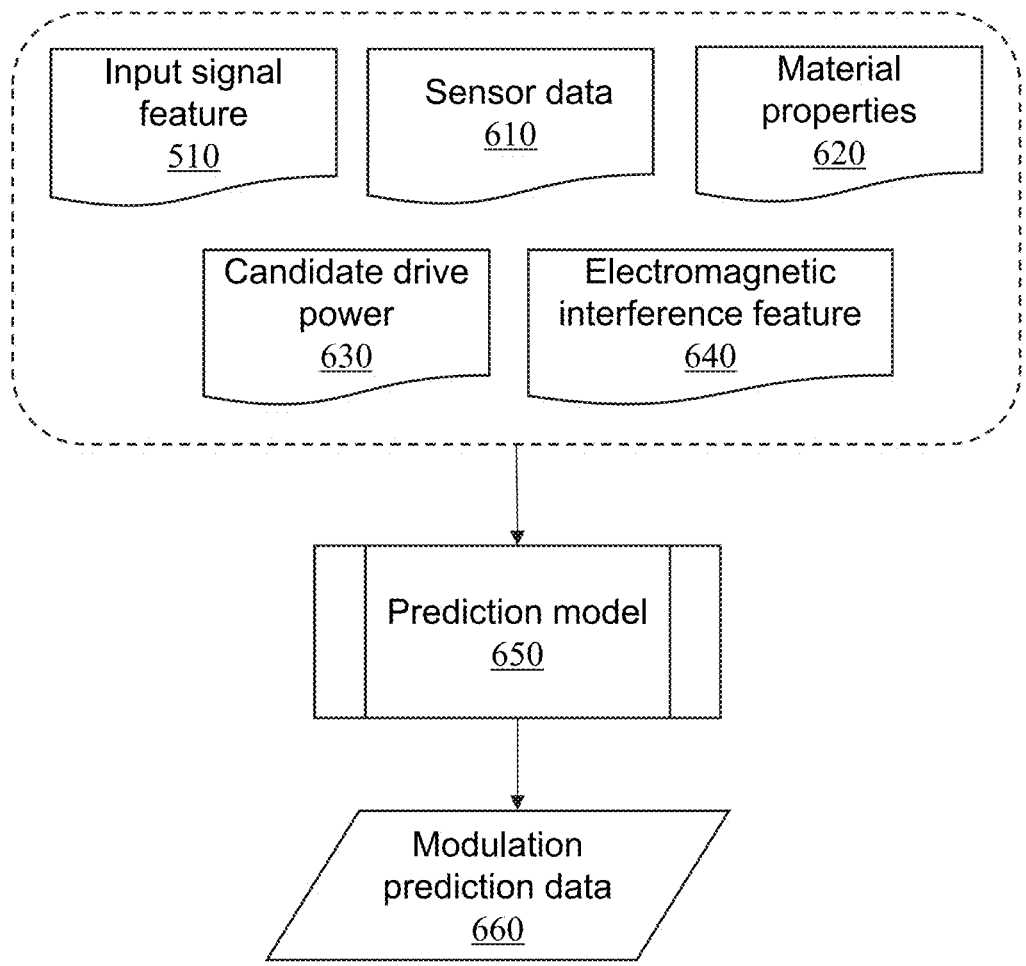
FIG. 6 is a schematic diagram illustrating determining modulated prediction data according to some embodiments of the present disclosure.

FIG. 6 is a schematic diagram illustrating determining modulated prediction data according to some embodiments of the present disclosure.

In some embodiments, as shown in FIG. 6, the microprocessor chip may determine, based on the input signal feature 510, the sensor data 610, material properties 620, the candidate drive power 630, and the electromagnetic interference feature 640, modulated prediction data 660 corresponding to each candidate drive power by a prediction model 650. Related descriptions of the input signal feature may be found in FIG. 5 and related descriptions thereof. More descriptions regarding the sensor data, the material properties, the candidate drive power, and the electromagnetic interference feature may be found in the related descriptions above.

In some embodiments, the prediction model may be a machine learning model, e.g., a recurrent neural network (RNN) model.

The prediction model may be obtained by training a plurality of second training samples with a second label. The training process of the prediction model is similar to that of the lattice constant confirmation model and is not described herein.

The second training sample includes sample signal characteristics, sample sensor data, sample material properties, sample electromagnetic interference feature, and sample candidate drive power (i.e., actual drive power used). The second label may be the actual modulated prediction data obtained when modulating using the sample candidate drive power (e.g., the actual acousto-optic conversion efficiency, acoustic wave propagation loss, difference in resonant frequencies, signal-to-noise ratio, and modulation efficiency). The second training sample and the second label may be obtained through experimentation.

In some embodiments, the microprocessor chip may obtain a plurality of corresponding modulation scores based on the modulated prediction data corresponding to the plurality of candidate drive powers, and select the candidate drive power with the highest modulation score among them as a target drive power.

In some embodiments of the present disclosure, by evaluating the modulation scores of different drive powers under the current environmental characteristics and the signal and selecting the drive power among them that is most suitable for that environment and that signal (i.e., with the highest modulation score), it is possible to ensure the optimal modulation effect in different environments and to improve the environmental suitability of the acousto-optic modulator.

In some embodiments of the present disclosure, determining the target drive power based on the modulation effect data results in optimal modulation of the acousto-optic modulator.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. An acousto-optic modulator enhanced by a sub-wavelength acoustic waveguide, comprising:
   a substrate, wherein the substrate includes a sapphire underlayment and a silicon dioxide layer disposed on the sapphire underlayment;
   the substrate further including a lithium niobate thin film, wherein the lithium niobate thin film includes a transducer region and a tapered transition region that are etched, the sub-wavelength acoustic waveguide, an acoustic-photonic crystal cavity, and a side-coupled photonic crystal; wherein
   the etched transducer region is provided with an interdigital transducer, the sub-wavelength acoustic waveguide is connected with the etched transducer region via the tapered transition region that is etched, the acoustic-photonic crystal cavity is connected with a non-suspended sub-wavelength acoustic waveguide and is arranged parallel to a suspended side-coupled photonic crystal;

the interdigital transducer, the tapered transition region, and the sub-wavelength acoustic waveguide are in a non-suspended state relative to the substrate; the acoustic-photonic crystal cavity and the side-coupled photonic crystal are in a suspended state relative to the substrate; and the acoustic-photonic crystal cavity includes periodically varying air holes formed by etching a suspended straight waveguide with identical height and width to the sub-wavelength acoustic waveguide, wherein the air holes include a defect region in a middle and mirror regions on both sides; the defect region is configured to confine resonance, and the mirror regions are configured to reflect and enhance the resonance;

the acousto-optic modulator further includes a microprocessor chip and a monitoring device, and the acoustic-photonic crystal cavity is further integrated with an electro-thermal micro-actuator configured as a micro-electro-mechanical-system (MEMS); wherein the microprocessor chip is configured to control the MEMS in the acoustic-photonic crystal cavity for heating and determine heating parameters of the MEMS based on sensor data and physical characteristics, wherein the sensor data includes a cavity temperature acquired by a temperature sensor, a cavity humidity acquired by a humidity sensor, pressure data acquired by a pressure sensor, or vibration data; and the physical characteristics include major axis dimensions, dimensions of a minor axis, a count of cells of the defect region and each of the mirror regions of the air holes of the sub-wavelength acoustic waveguide and the acoustic-photonic crystal cavity, an angle of the sub-wavelength acoustic waveguide, a thickness of the lithium niobate thin film, and a thickness of the silicon dioxide layer, a width of the transducer region, a finger width of the interdigital transducer and the number of finger pairs; and the monitoring device is configured to acquire the sensor data.

2. The acousto-optic modulator of claim 1, wherein an acoustic mode in the sub-wavelength acoustic waveguide is a bound-state acoustic-like surface wave mode.

3. The acousto-optic modulator of claim 1, wherein widths of the sub-wavelength acoustic waveguide and the acoustic-photonic crystal cavity are within a range of 300 nm to 3000 nm; an angle of the sub-wavelength acoustic waveguide is within a range of 0° to 90°, and a bending radius of the sub-wavelength acoustic waveguide is greater than 20 times an acoustic wavelength.

4. The acousto-optic modulator of claim 1, wherein a lattice constant of the acoustic-photonic crystal cavity is within a range of 200 nm to 600 nm, a length along a major axis of the acoustic-photonic crystal cavity is within a range of 400 nm to 1000 nm, and a length along a minor axis of the acoustic-photonic crystal cavity is within a range of 100 nm to 500 nm; and the defect region includes 15 to 60 unit cells, and each of the mirror regions includes 15 to 60 unit cells; and the side-coupled photonic crystal includes a photonic crystal, a lattice constant of the photonic crystal is within a range of 150 nm to 400 nm, a length along a major axis of the photonic crystal is within a range of 200 nm to 600 nm, and a length along a minor axis of the photonic crystal is within a range of 80 nm to 400 nm.

5. The acousto-optic modulator of claim 1, wherein an orientation of the lithium niobate thin film relative to the interdigital transducer is denoted as X-Y; a width of the transducer region is within a range of 2 μm to 20 μm; a finger width of the interdigital transducer is within a range of 0.2 μm to 5 μm, a number of finger pairs of the interdigital transducer is within a range of 20 to 300; and the interdigital transducer is configured to excite Rayleigh-like waves and Love-like waves in a frequency range of 300 MHz to 8 GHz.

6. The acousto-optic modulator of claim 1, wherein a thickness of the lithium niobate thin film is within a range of 200 nm to 600 nm, and a thickness of the silicon dioxide layer in the substrate is within a range of 500 nm to 2000 nm.

7. The acousto-optic modulator of claim 1, wherein to determine heating parameters of the MEMS based on sensor data and physical characteristics, the microprocessor chip is further configured to:

determine a target lattice constant by a lattice constant determination model based on an input signal feature, the physical characteristics, a current drive power, a current drive voltage, and the sensor data, and determine the heating parameters of the MEMS based on the target lattice constant; wherein the input signal feature includes an optical wavelength and an acoustic wave frequency, the input signal feature is obtained through a Fiber Bragg Grating (FBG) sensor, an oscilloscope, and a piezoelectric sensor, the current drive power and the current drive voltage are directly read by the microprocessor chip, and the lattice constant determination model is a Neural Network (NN) model.

8. The acousto-optic modulator of claim 7, wherein to determine the heating parameters of the MEMS based on the target lattice constant, the microprocessor chip is further configured to:

determine the heating parameters of the MEMS corresponding to the target lattice constant by using a mapping table based on the target lattice constant and the current drive voltage, wherein the mapping table includes a plurality of mapping tables or mapping relationships between a plurality of reference lattice constants, reference drive voltages, and reference heating parameters.

9. The acousto-optic modulator of claim 7, wherein the lattice constant determination model is obtained by training a plurality of first training samples with first labels, the training of the lattice constant determination model includes:

inputting the plurality of first training samples with the first labels into an initial lattice constant determination model, constructing a loss function through each first label and the output of the initial lattice constant determination model, iteratively updates parameters of the initial lattice constant determination model based on the loss function by gradient descent; and in response to a preset condition being satisfied, completing the training, and the trained lattice constant determination model is obtained; wherein the preset condition includes a loss function converges or a number of iterations reach a threshold.

10. The acousto-optic modulator of claim 1, wherein the heating parameters of the MEMS include target temperatures for each time period, the target temperature is a pre-determined temperature to be reached by the MEMS, the MEMS has a progressive heating mode, in response to the cavity temperature falling below a lower temperature limit, the microprocessor chip is configured to adjust the heating parameters of the MEMS, causing the cavity temperature to return to a preset temperature range.

11. The acousto-optic modulator of claim 10, wherein the microprocessor chip is further configured to set an upper limit of heating temperature of the MEMS, when the heating temperature reaches the upper limit of the heating temperature, the MEMS triggers an overheating protection mechanism, and the overheating protection mechanism includes reducing a heating power or suspending an operation.

12. The acousto-optic modulator of claim 1, wherein to determine heating parameters of the MEMS based on sensor data and physical characteristics, the microprocessor chip is further configured to:
constructing a stabilizing feature vector based on the sensor data and the physical characteristics; and
determining the heating parameters of the MEMS based on a retrieval result of the stabilizing feature vector in a first vector database.

13. The acousto-optic modulator of claim 12, wherein the first vector database is constructed by performing:
conducting experiments on the acousto-optic modulator under different experimental conditions;
taking the physical characteristics of the experiments and the sensor data acquired during the experiments as reference stabilizing feature vectors; wherein the experiments include heating the acoustic-photonic crystal cavity to different temperatures by the MEMS and modulating the acoustic-photonic crystal cavity;
recording the sensor data and determining a modulation score; and
designating a heating parameter when the modulation score of the MEMS is high as a reference heating parameter corresponding to the reference stabilizing feature vectors; and placing a plurality of reference stabilizing feature vectors and the corresponding reference heating parameters into the first vector database.

14. The acousto-optic modulator of claim 1, wherein the microprocessor chip is further configured to determine a target drive power for the interdigital transducer based on modulation effect data, the modulation effect data includes an acousto-optic conversion efficiency, an acoustic wave propagation loss, and a difference in resonant frequencies; wherein
the acousto-optic conversion efficiency is obtained by a microwave power meter and a photodetector set externally to the acousto-optic modulator;
the acoustic wave propagation loss is determined by comparing a difference between an input power of the interdigital transducer and a received power of the acoustic-photonic crystal cavity;
the input power of the interdigital transducer and the received power of the acoustic-photonic crystal cavity are obtained using a microwave power meter set externally to the acousto-optic modulator; and
the difference in resonant frequencies is obtained by an acoustic wave sensor.

15. The acousto-optic modulator of claim 14, wherein to determine a target drive power for the interdigital transducer based on modulation effect data, the microprocessor chip is further configured to:
perform a plurality of tests of the acousto-optic modulator by iterating to obtain a plurality of drive powers and the modulation effect data corresponding to the interdigital transducer during a preset time period, wherein a drive power that satisfies a preset condition is used as the target drive power,
the preset condition includes a difference between the acousto-optic conversion efficiency and target acousto-optic conversion efficiency during the preset time period being less than a first threshold, a difference between the acoustic wave propagation loss and the target acoustic wave propagation loss being less than a second threshold, or a weighted sum of the acousto-optic conversion efficiency and the acoustic wave propagation loss being less than a third threshold; and
an iterative process comprises:
setting initial parameters, wherein the initial parameters include an initial drive power, a learning rate, a perturbation step size, a convergence threshold, a maximal number of iterations, and a safe range of the drive power;
performing an iterative optimization, comprising:
measuring the drive power and an iteration efficiency of a current iteration;
determining, based on the perturbation step size, a post-perturbation drive power and a corresponding post-perturbation iteration efficiency;
calculating a gradient based on the perturbation step size, a current iteration efficiency, and the corresponding post-perturbation iteration efficiency; and
determining an updated drive power based on the gradient, the learning rate, and a current drive power; and
ending the current iteration when a preset iteration condition is satisfied.

16. The acousto-optic modulator of claim 14, wherein the microprocessor chip is further configured to:
obtain a candidate drive power;
determine, based on an input signal feature, the sensor data, material properties, the candidate drive power, and an electromagnetic interference feature, modulated prediction data corresponding to each candidate drive power using a prediction model, the prediction model being a machine learning model; and
determine the target drive power based on the modulated prediction data corresponding to the each candidate drive power.

17. The acousto-optic modulator of claim 16, wherein the microprocessor chip is further configured to:
obtain the electromagnetic interference feature by electromagnetic field probes provided externally to the acousto-optic modulator;
determine a preset candidate range based on the material properties, the electromagnetic interference feature, and the physical characteristics; and
generate the candidate drive power based on the preset candidate range; wherein the material properties include electrical properties, optical properties, and acoustic properties of a material of the acousto-optic modulator; wherein the material properties are obtained by technicians from a factory report of the acousto-optic modulator.

18. The acousto-optic modulator of claim 17, wherein the microprocessor chip is further configured to:
randomly adjust a current drive power of the interdigital transducer within a preset power range to obtain the candidate drive power; wherein the preset power range is a range of the drive power corresponding to a drive power at which the interdigital transducer is not damaged.

19. The acousto-optic modulator of claim 17, wherein to determine a preset candidate range based on the material properties, the electromagnetic interference feature, and the physical characteristics, the microprocessor chip is further configured to:

construct a noise feature vector based on the material properties, the electromagnetic interference feature, and the physical characteristics, and determine, based on noise feature vectors, a reference candidate range corresponding to a reference noise feature vector in a second vector database that satisfies a first preset condition, as the preset candidate range; wherein the first preset condition includes one of a vector distance between the reference noise feature vector and the noise feature vector being less than a distance threshold, or a similarity between the reference noise feature vector and the noise feature vector being greater than a similarity threshold.

* * * * *